UNITED STATES PATENT OFFICE.

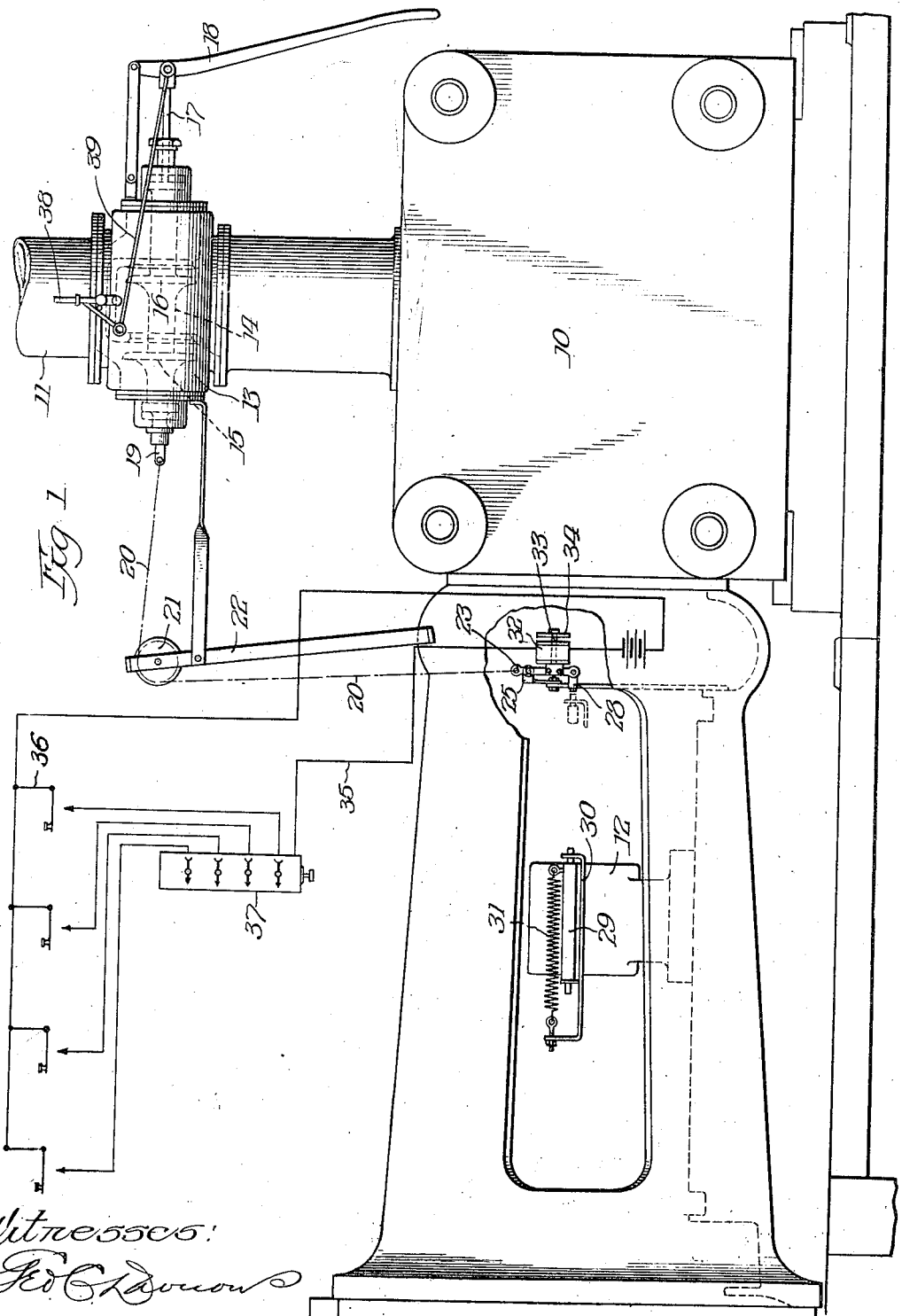

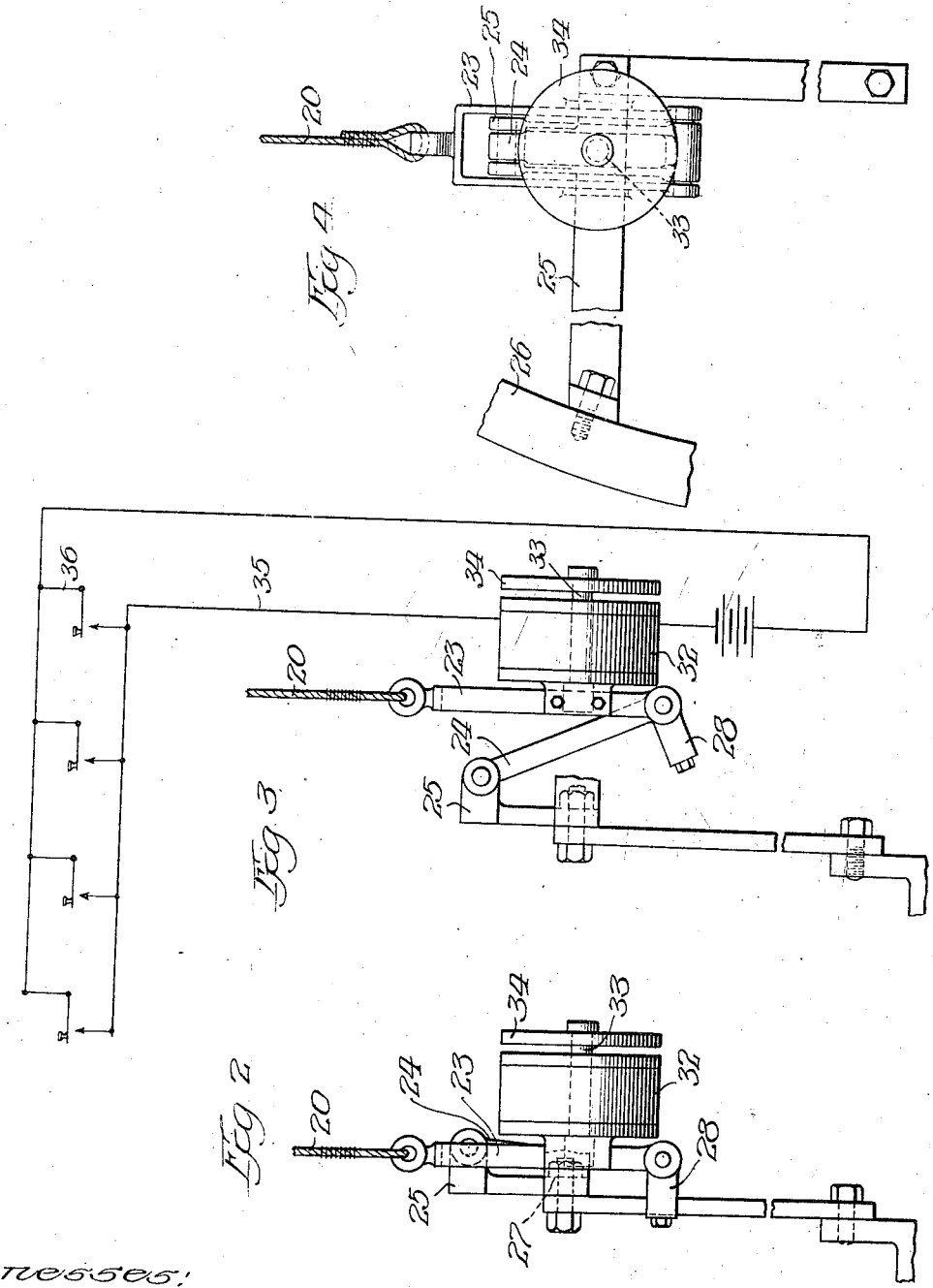

GEORGE J. WILLETT, OF MILWAUKEE, WISCONSIN.

AUTOMATIC SPEED-LIMIT CONTROL.

1,185,269.

Specification of Letters Patent. Patented May 30, 1916.

Application filed August 11, 1915. Serial No. 45,038.

*To all whom it may concern:*

Be it known that I, GEORGE J. WILLETT, a citizen of the United States, and resident of Milwaukee, in the county of Milwaukee and State of Wisconsin, have invented certain new and useful Improvements in Automatic Speed-Limit Controls, of which the following is a specification.

My invention relates to means for automatically stopping engines, and has particular reference to an improved mechanism which shall be more safe and certain in operation than any heretofore proposed.

In mills, and particularly rolling mills, it is essential that means be provided for stopping the engine quickly and automatically when the speed thereof exceeds a predetermined maximum, or when disarrangement of machines operated thereby and located at a distance necessitates the stoppage of the prime mover.

I am aware that many mechanisms have been devised for accomplishing this result, but even the most efficient thereof at present on the market are not infallible and frequently their failure to operate results in a complete wreckage of a plant costing thousands of dollars. The present device has been designed with the object of utmost simplicity in view; the elimination of springs from the valve operating mechanism, and the utilization of the motive fluid itself as a means for shutting off the power.

A further object is to provide a construction in which, if any of the parts break or deteriorate through lack of use, the engine will stop.

The invention will be more readily understood by reference to the accompanying drawings, in which—

Figure 1 is a side elevation of a portion of a steam engine to which my improvements have been applied; Fig. 2 is a side elevation of the toggle by means of which the valve is held in open position, the parts being shown in their normal location; Fig. 3 is a view similar to Fig. 2, showing the parts in tripped position, and Fig. 4 is a view taken at right angles to that of Figs. 2 and 3.

Referring more particularly to the drawings, it will be seen that the engine may include a cylinder 10, a steam pipe 11, and a cross head 12. Within the steam pipe 11, I interpose a valve casing 13, within which I mount an unbalanced valve 14. The unbalanced feature is secured by making the area of the valve member 15 somewhat greater than that of the valve member 16. The stem of the valve 14 projects through both ends of the casing and is suitably packed. To one end 17 of the stem I connect an operating lever 18, and to the other end 19 of the stem I connect a cable 20, which extends over a pulley 21, held in a bracket 22, and connects at its lower end to a U-shaped link 23. This link is connected to a second link 24, pivoted at one end to a bracket 25, which bracket is fixed to a portion of the engine frame 26. The two links 23, 24 form a toggle, and in their normal position, as shown in Fig. 2, are adapted to lie slightly out of parallelism, the pull exerted by the cable tending to force the toggle against a stop 27 formed on the bracket 25. It will be seen, however, that a slight force exerted against the free end of the toggle, as against the projection 28, will serve to swing the two links past the center and permit the cable to move upwardly. Due to the unbalanced character of the valve 14, there is a constant pull on the cable while steam is being admitted to the engine, and whenever the toggle is broken, the valve 14 will seat itself. The described action is caused to take place under two conditions, the first of which is that of excessive speed of the engine, and the second is a disarrangement of the mechanism operated by the engine and located at a distance. The tripping of the stop, due to excessive speed, may be caused by the inertia reciprocating weight, best shown in Fig. 1, which includes a weight 29, mounted in brackets 30, secured to the cross head 12 of the engine; the reduced ends of the weight find a bearing in the brackets. It will be noted that the weight is mounted with freedom for limited reciprocation in its bearings and is normally held in the position of Fig. 1 by a coiled spring 31, one end of which is attached to the weight, and the other to the bracket 30. The brackets, weight and spring reciprocate bodily with the cross head and normally the end of the weight does not contact the projection 28 on the link 23 when the cross head is moved to its extreme position. However, the tension of the spring will be adjusted, in order that an increase of speed of the engine will cause the weight to be thrust forward, due to its inertia, upon the completion of the stroke of the cross head, and in such position the end of the weight will contact the projection 28 and break the toggle. It will be noted that if the spring should break or become weakened in service, the engine will be stopped.

As to the second necessity for stopping the engine, I provide electric means, including a solenoid 32 secured to the U-shaped link 23. The core 33 of the solenoid projects through the bearing and lies normally in proximity to the stop 27, as best shown in Fig. 2. The armature 34, which is connected to the core 33, is located outside of the solenoid, and it will be seen that when the solenoid or magnet is energized, the armature 34 will be brought closer, the core 33 will be forced to the left, as viewed in Figs. 2 and 3, and the toggle will be broken in the same manner as when the stop 28 is contacted by the weight. Electrical connections 35 extend from the solenoid to various points throughout the plant where buttons or keys 36 may be located, thus enabling the stopping of the engine from distant points. I may prefer also to interpose an annunciator 37 in the line, which instrument will be located near the engineer's station in order that he may determine, when the engine stops, whether it has been stopped by excessive speed, or because of the closing of one of the keys 36. In the latter case he is also able to determine where the trouble has arisen and to send assistance to that point. In the case of stoppage because of excessive speed, he may at once start the engine into operation by actuating the lever 18. This he would not do if the engine had been stopped by the closing of one of the keys, at least not without determining that the trouble which caused the stoppage of the engine has been corrected. I may prefer also to connect a whistle 38 to the steam pipe, which whistle may be operated by a connection 39 to the lever 18, the whistle being opened by a closing of the valve.

It will be noted that the emergency throttle valve is positively held open; that the valve is unbalanced, and that the seating thereof is caused by the steam pressure and is not dependent upon a spring; that if any part of the governing mechanism is broken, the engine will be stopped; that there is no mechanism between the valve and the trip therefor, and, therefore, there is nothing to become out of order.

Obviously the construction is capable of much modification and such modifications as are within the scope of my claims I consider within the spirit of my invention.

I claim:

1. In an engine stop, the combination of an unbalanced emergency throttle valve, a pair of links, a cable connecting said valve to one of said links, said links being positioned whereby a pull on said cable is normally exerted substantially in line with the pivots of said links, and an inertia trip actuatable by a moving part of an engine for shifting the position of said links and permitting the seating of said emergency valve, substantially as described.

2. In an automatic engine stop, the combination of an unbalanced valve, a toggle, one end of which is fixed to a support, means connecting said toggle and said valve, said toggle being normally positioned with two toggle arms in substantial alinement, and a weight carried by a moving part of the engine and adapted, when a predetermined speed is reached, to move said toggle arms out of alinement and permit the seating of said unbalanced valve, substantially as described.

3. In an engine stop, the combination of an unbalanced throttle valve, a trip, a cable connecting said trip and said valve and serving to maintain said valve in open position, an inertia trip actuatable by moving part of an engine and adapted to coöperate with said trip to release the same when an excessive speed has been reached by said engine, and a spring which serves to retain said inertia trip in operative position, the arrangement being such that said unbalanced valve becomes operative and closes the valve to stop the engine when said cable becomes broken or said spring is weakened, substantially as described.

Signed at Milwaukee, Wisconsin, this 31st day of July, 1915.

GEORGE J. WILLETT.

Witnesses:
E. H. POLZIN,
E. G. GREENYA.

Copies of this patent may be obtained for five cents each, by addressing the "Commissioner of Patents, Washington, D. C."